Aug. 6, 1957

R. M. PAGE ET AL 2,802,106

SIGNAL CONVERTER SYSTEM

Filed Nov. 14, 1945

Inventors
ROBERT M. PAGE
PETER WATERMAN

By Ralph L. Chappell
Attorney

United States Patent Office 2,802,106

Patented Aug. 6, 1957

2,802,106

SIGNAL CONVERTER SYSTEM

Robert M. Page and Peter Waterman, Washington, D. C.

Application November 14, 1945, Serial No. 628,624

3 Claims. (Cl. 250—27)

(Granted under Title 35, U. S. Code (1952), sec. 266)

This invention relates generally to an electronic amplifier circuit, and particularly to a direct or alternating current signal converter.

In numerous electronic control circuits, the control signal exists as a direct current signal component, whose characteristics determine its effect. Available among these characteristics, are varying amplitude and changing polarity. Given such a signal, it frequently occurs that before the same may be put into practical use, it is necessary to amplify and convert it to an alternating current signal. In performing such signal conversion, however, it is essential that the original signal qualities be retained in one form or another.

It is accordingly an object of this invention to provide a direct to alternating current signal converter which preserves, in one form or another, the qualities of the original signal.

It is another object of this invention to provide a direct to alternating current signal converter whose output signal amplitude is proportional to the applied direct current signal level.

It is another object of this invention to provide a direct to alternating current signal converter whose output signal phase is governed by the polarity of the applied direct current signal.

Other objects and features of the present invention will become apparent upon a careful consideration of the following detailed description when taken together with the accompanying drawings.

Figure 1:
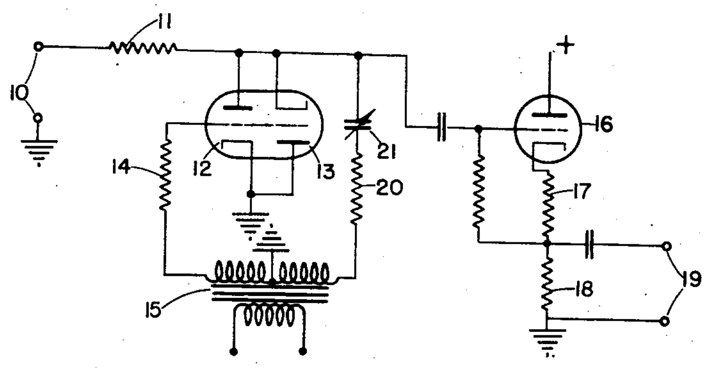
Figure 2:
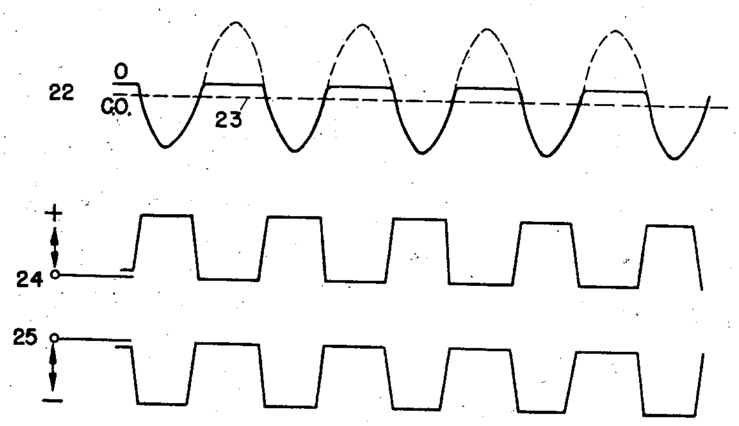

Fig. 1 is a detailed circuit diagram of a preferred embodiment of the invention, and Fig. 2 shows a series of waveforms useful in explaining the operation of Fig. 1.

Signal conversion, as taught by the invention is accomplished by a voltage divider circuit, comprising a series connection of a fixed impedance element and a vacuum tube impedance element. The vacuum tube impedance element is arranged, in such a manner, that upon application of a suitable alternating current reference signal to the vacuum tube, the resistance represented thereby will alternately vary from substantially zero to infinity. Then, by connecting across the divider circuit, the direct current signal which is to be converted, an alternating current signal will be produced across either one of the impedance elements forming the divider circuit. The amplitude of this alternating current signal will be proportional to the applied direct current signal level, and its phase relative to the reference signal will be governed by the polarity of the applied direct current signal.

In particular, the preferred embodiment of the invention is shown in Fig. 1, to which reference is now had. The direct current signal which is to be converted, is applied to a pair of input terminals 10, across which the voltage dividing network of the invention is connected. The voltage dividing network, comprises a signal fixed resistance element 11, and a pair of vacuum tube components 12 and 13. Tubes 12 and 13 are connected in back to back relation; that is the plate and cathode of tube 12 is connected respectively to the cathode and plate of tube 13, so as to provide voltage divider action regardless of the polarity of the direct current signal impressed at terminals 10. Specifically, when the signal applied to terminals 10 is positive in polarity, tube 12 becomes operative and tube 13 becomes inoperative. Conversely, when the signal applied to terminals 10 is negative in polarity, tube 13 becomes operative and tube 12 becomes inoperative.

The control grids of tubes 12 and 13 are connected through a suitable current limiting resistance 14 to one side of the grounded center tapped secondary winding of transformer 15. The primary winding of transformer 15 is connected to an alternating current reference signal, of suitable frequency, for controlling the instantaneous resistance of tubes 12 and 13. During one half cycle of the reference signal applied to transformer 15, tube 12 or 13, depending on the polarity of the direct current signal applied to terminals 10, will be driven to cut-off and will therefore represent an infinite resistance. During the next succeeding half cycle, tube 12 or 13 will be driven to full conduction and will therefore represent substantially a short circuit resistance. It follows that a voltage applied at terminals 10 will divide across resistance 11 and tube 12 or 13 according to the instantaneous impedance of the tube. For instance, during the interval that tube 12 or 13 represents an infinite resistance, substantially all the voltage applied at terminals 10 will appear across the tube. Conversely, during the interval tube 12 or 13 represents substantially a short circuit resistance, zero voltage will appear across the tube.

Tubes 12 and 13 are preferably of the high vacuum tube variety and therefore always possess a certain finite amount of resistance. Accordingly, if the voltage appearing across the tube is to be at an absolute minimum during the time one of the tubes is in a fully conducting condition, the magnitude of resistance 11 should be made large in comparison to the resistance of the tubes. Notice should be taken of the fact that since tubes 12 and 13 represent resistances which vary from infinity to substantially zero, the circuit as thus far described fails to provide a suitable output point of constant impedance. To provide such a point, the alternating current signal obtained from across the tubes is applied to the grid of vacuum tube component 16. Tube 16 is provided with a pair of un-bypassed cathode resistances 17 and 18, arranged so as to make tube 16 operate as a cathode follower. Since tube 16 operates as a cathode follower, its input impedance is extremely high, and will not therefore disturb the operation of the rest of the circuit. Moreover, since tube 16 operates as a cathode follower, a pair of output terminals may be connected across one or both of the cathode resistances, 18 for example, to provide a low and constant impedance output connection.

A more complete understanding of the operation of the circuit may be had upon reference to the waveforms shown in Fig. 2. Waveform 22 represents the signal obtained from transformer 15, and is applied to the grids of tubes 12 and 13. Superimposed upon this waveform is a dotted line 23 which represents the cut-off potential for the tubes. As indicated in the waveform, the positive half cycles of the applied grid signal are suppressed. Suppression of these half cycles is due to grid current flowing through current limiting resistance 14. Specifically, as the applied signal tries to drive the grids positive, grid current flows to cause a voltage drop to occur across resistance 14, and thus to prevent the grid itself from rising excessively positive. The grids, do however, rise a few volts positive depending upon the relative magnitudes of the grid cathode resistance of the tubes and resistance 14. Waveform 24 represents the alternating current signal appearing across the tubes, and hence at the output terminals 19, when the direct current signal applied at terminals 10 is positive in polarity. As indicated by waveforms 22 and 24, the alternating signal appearing across the tube starts out at nearly zero potential and rises abruptly. When the applied grid signal reaches the cut-off potential, the signal appearing across the tubes reaches full amplitude. The voltage across the tube then remains at full amplitude until the applied grid signal of waveform 22 returns to the cut-off line 23. Thereafter, the voltage across the tube drops to substantially zero, where it remains until the next succeeding negative half cycle of applied grid signal. Notice should be taken of the fact that when the applied direct current signal is positive, the effective phase of the output signal is essentially opposite that of the reference signal applied to transformer 15.

Waveform 25 represents the voltage signal appearing across the tubes when the signal applied at terminals 10 is negative in polarity. Notice should be taken of the fact that when the applied direct current signal is negative in polarity, the effective phase of the output signal is the same as the reference signal applied to the transformer 15. Thus as the polarity of the direct current signal applied at terminals 10 changes, the phase of the output signal reverses.

As apparent from waveforms 24 and 25, the leading and trailing edges of the output signal are not vertically abrupt, but contain a slight amount of slope. The reason being, that a finite amount of time is involved in driving the vacuum tube impedance elements 12 and 13, from cut-off to a fully conducting condition and vice versa. The steepness of the leading and trailing edges of the output signal, however, can be improved by increasing the amplitude of the reference signal applied to the tube grids.

Due to inter-electrode capacities, a certain amount of the reference signal applied to the grids of tubes 12 and 13 will be coupled to the grid of tube 16, and will consequently appear at the output terminals 19. If this signal component is not eliminated, the condition of zero signal output at terminals 19 for zero signal input at terminals 10 can never be obtained. Accordingly, the right hand side of the secondary winding of transformer 15, which yields a signal opposite in phase to the applied grid signal, is connected through a suitable attenuating device to the grid of tube 16. In the preferred form, this attenuating device comprises a series connection of resistance 20 and capacitance 21. Adjustment of capacitance 21, regulates the neutralizing component of the reference signal obtained from transformer 15, so as to provide complete cancellation of the reference signal component in the circuit output terminals 19.

Althought we have shown only a certain and specific embodiment of the invention, it is to be understood that we are fully aware of the many modifications possible thereof. Therefore, this invention is not to be restricted except insofar as is necessitated by the spirit of the prior art and the scope of the appended claims.

The invention described herein may be manufactured and used by or for the Government of the United States of America for governmental purposes without the payment of any royalties thereon or therefor.

What is claimed is:

1. A direct current signal to alternating current signal converter comprising, a vacuum tube impedance element having at least one control element, a reference signal applied to said control element for alternately changing said vacuum tube from a high resistance element to a low resistance element, a fixed resistance element connected in series with said vacuum tube impedance element, means for applying the direct current signal to be converted across said impedance elements in series, means for obtaining an output signal from across one of said impedance elements, and means including an attenuating network for coupling a phase opposed portion of said reference signal to the circuit output, so as to neutralize the component of said reference signal coupled to the circuit output by inter-electrode capacities in said vacuum tube impedance element.

2. A direct current signal to alternating signal converter comprising, a pair of vacuum tube impedance elements each having at least an anode, a cathode and a control grid, the cathode and anode of one of said tubes directly connected respectively to the anode and cathode of the other to form parallel paths of conduction, an alternating current reference sine wave signal applied to the control grids of both of said tubes in parallel for alternately changing their resistance characteristic from a high to a low value, a fixed impedance element connected in series with the parallel paths of conduction formed by said vacuum tube impedance elements, means connecting the direct current signal to be converted across the combination of said impedance elements, and means including an attenuating network for coupling a phase opposed portion of said reference signal coupled to the circuit output by interelectrode capacities in said vacuum tube impedance element.

3. Apparatus for converting a direct current to an alternating current having a magnitude and phase in dependency upon the magnitude and polarity respectively of the direct current comprising, a source of direct current, a pair of unilateral variable impedance devices each having an impedance control element, said pair of unilateral variable impedance devices connected in reverse parallel such that a bidirectional impedance path is formed, an impedance element, means connecting said source and said impedance element in series with said pair of unilateral variable impedance devices, a reference sine wave voltage source, means applying the reference sine wave voltage source to each of the control elements of said unilateral variable impedance devices, an output impedance means connected across said pair of unilateral variable impedance devices, means including an attenuating network for coupling a phase opposed portion of said reference sine wave voltage signal to said output impedance means.

References Cited in the file of this patent

UNITED STATES PATENTS

| | | |
|---|---|---|
| 2,036,532 | Knoll et al. | Apr. 7, 1936 |
| 2,288,600 | Arndt | July 7, 1942 |
| 2,293,135 | Hallmark | Aug. 18, 1942 |
| 2,323,966 | Artzt | July 13, 1943 |
| 2,438,947 | Reike et al. | Apr. 6, 1948 |